July 16, 1957  K. WILFERT  2,799,528
RESILIENT LEAD-IN CONNECTIONS FOR CABLES, RODS, ETC., IN
MOTOR VEHICLES OF THE CELLULAR TYPE Filed Sept. 7, 1954  2 Sheets-Sheet 1

KARL WILFERT
INVENTOR

BY Dicke and Craig.

ATTORNEYS.

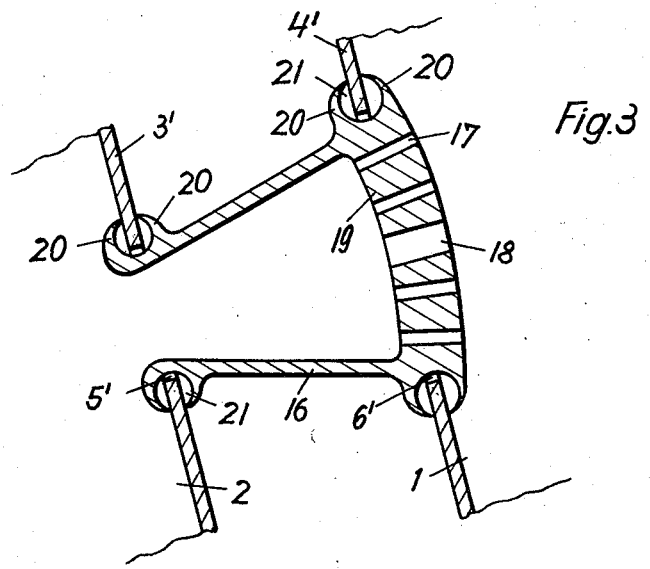
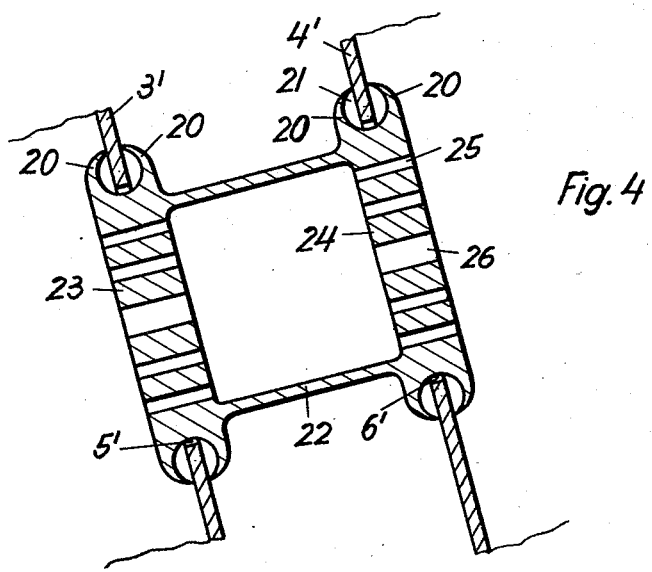

United States Patent Office 2,799,528  
Patented July 16, 1957

2,799,528

RESILIENT LEAD-IN CONNECTIONS FOR CABLES, RODS, ETC., IN MOTOR VEHICLES OF THE CELLULAR TYPE

Karl Wilfert, Stuttgart-Degerloch, Germany, assignor to Daimler-Benz Aktiengesellschaft, Stuttgart-Unterturkheim, Germany Application September 7, 1954, Serial No. 454,553

Claims priority, application Germany September 7, 1953

10 Claims. (Cl. 296—28)

The present invention relates to a lead-in for cables, rods, pipes, and similar conduits passing from one compartment of a motor vehicle to another through a gap or opening connected to the outside, and more particularly this invention is applicable to automobiles and similar vehicles the individual parts of which are built in the form of separate, substantially self-contained cells or compartments which are subsequently assembled and secured together.

The lead-ins for cables, rods, pipes, and similar conduits passing from one vehicle cell to the other previously consisted, for example, of metallic sleeves which were mounted on the adjacent separating walls by means of resilient packings and also served to secure the adjacent cells together.

An object of the present invention, however, is to provide a lead-in structure which only serves that purpose and is made as resilient as possible so as to take up and absorb any possible movements of the adjacent compartment walls relative to each other.

An essential feature of the invention thus consists in mounting the respective conduit or conduits at their passage from one cell or compartment to another within a resilient sleeve which preferably consists of synthetic rubber or similar material and seals off the lead-in openings in the adjacent cells relative to each other as well as against the space intermediate the cells and communicating with the outside so as to be gas, dust, and water tight. Such a lead-in not only protects the conduits passing therethrough from the dust and dirt in the space or thrown up from the road, but it also provides a tight and reliable seal of the interior of the cells toward the outside against the entry of any moisture, gases, or dust.

Another object of the invention is to provide an effective soundproofing of the individual cells and cell openings relative to each other and toward the outside, and a feature for attaining this object resides in the provision of a resilient sleeve as previously mentioned which absorbs the noise which otherwise would enter through the lead-in openings.

Finally, by making the resilient sleeve of a synthetic rubber such as known under the trade name "Buna," it will also be effectively protected from the deteriorating action of gasoline.

A sleeve designed according to the invention as a lead-in for a cable, rod, pipe or similar conduit preferably consists of a tubular socket which loosely surrounds the conduit over a considerable length thereof and tightly encloses the same only at one end of the socket. The sleeve or socket also acts as a bearing element of the conduit as well as a resilient mounting along the outside thereof, thereby closely abutting against the walls forming the intervening space between the two adjacent cells and tightly sealing the lead-in openings toward the outside, i. e., toward the space between the adjacent cells, as well as the cells themselves toward each other. For a more effective sealing, the lead-in openings in each cell wall are preferably provided with inwardly directed annular flanges against which the outer surface of the resilient socket tightly abuts.

A socket serving as a lead-in for several conduits is preferably made of funnel-like shape, and the individual conduits passing through the funnel are tightly sealed and supported in individual openings in a transverse wall on the wider side of the socket, while at its narrower side the funnel is left open to pass all the conduits together therethrough. Preferably also on either side of each of the two cell walls such a lead-in socket is provided with outer annular sealing collars which grip the cell walls on either side of the lead-in opening and seal the same resiliently both toward the space intermediate the adjacent cell walls as well as the cells themselves against each other.

Further objects, features, and advantages of the present invention will appear from the following detailed description of three different embodiments thereof and the accompanying drawings, in which:

Fig. 1 diagrammatically illustrates an automobile built according to the cell or compartment system, in which the space intermediate the two closed cells is bridged by a lead-in socket according to the invention;

Fig. 3 shows a similar section through a modified lead-in socket; while

Fig. 4 shows a similar section through a third embodiment of the invention.

Figure 1:
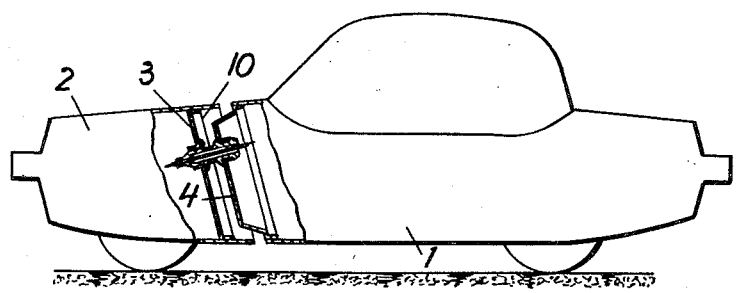
Figure 2:
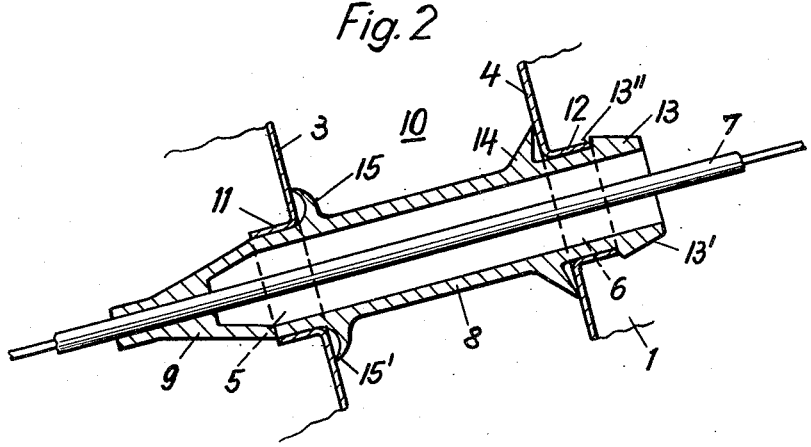
Fig. 2 shows a longitudinal enlarged section through the lead-in socket shown in Fig. 1.

Referring particularly to Figs. 1 and 2 of the drawings, an automobile built according to the cell or compartment system comprises a main cell 1 and a front cell 2 the opposite outer walls 3 and 4 of which have corresponding lead-in openings 5 and 6, respectively, for passing a cable 7 therethrough. The lead-in essentially consists of a tubular socket 8 enclosing the cable 7 and consisting of resilient material, such as synthetic rubber. The larger, central part of socket 8 loosely surrounds the cable 7 and only one end 9 thereof tightly encloses the same and at the same time acts as a bearing element thereof. On its outside, the socket 8 is resiliently mounted on the outer walls 3 and 4 of the two cells so as to seal the openings 5 and 6 against the intermediate space 10, the socket being so disposed that the end 9 thereof which tightly seals and grips the cable 5 lies within the forward cell 2. The mounting and sealing of the central sleevelike part 8 of the socket in the two cell walls 3 and 4 is preferably improved by providing the openings 5 and 6 with annular, coaxial flanges 11 and 12, respectively, which extend in opposite directions, i. e. toward the inside of the cells 1 and 2. These flanges 11 and 12 provide ample internal bearing surfaces for the socket 8 which tightly fits therein. For avoiding any possible axial movement of the socket 8 and to lock it securely in place relative to walls 3 and 4, the outer surface of the socket is also provided with peripheral projections 13, 14, and 15, the outer smaller projection 13 in fact forming a thickened end portion with a conical outer surface 13' to facilitate its insertion into the flange 12. The two inner projections 14 and 15 at their root are spaced apart a distance slightly exceeding the distance between the walls 3 and 4 and gradually decrease in thickness toward their outer periphery, and are, in cross section, either of angular shape bent toward the respective outer end of the socket 8, as shown by the projection 14, or of an outwardly curved shape, as shown by projection 15. In either event, when inserted into the flanges 11 and 12, the annular projections 14 and 15 each have the effect of a suction cup, tightly pressing against the opposite walls 3 and 4 around the openings 5 and 6, in which position they are securely locked by the projection 13 gripping the edge 13" of the flange 12. Since the other end of socket 8 for easier insertion thereof does not carry an outer locking projection similar to projection 13, but its projection 15 should still exert a tight sealing effect against the wall 3 around the opening 5, even though it should admit a small movement of the two cell walls 3 and 4 relative to each other, its peripheral edge 15' prior to insertion in the opening 5 is preferably bent or curved strongly toward the outer end 9 of the socket 8 so as to permit a certain movement of the cell wall 3 away from wall 4 without danger that the suction-cup effect of projection 15 on wall 3 might thereby be broken. Obviously, if desired, a locking projection similar to projection 13 may, however, also be provided to cooperate with the projection 15. The insertion of the socket 8 into the openings 5 and 6 is easily carried out because of its resiliency and the fact that it tightly surrounds the cable 7 merely at one end, while its main body portion, as clearly seen in Fig. 2 is spaced a considerable distance from the cable, thus allowing it to be easily bent, compressed or deformed to be pushed into, or removed from the openings 3 and 4.

Fig. 3 illustrates a modification of the socket according to the invention for passing several conduits from one cell to the other through the same lead-in openings therein. Since in this embodiment of the invention the conduits are to be gripped individually and spaced apart merely by one end wall 19 of the socket 16, the socket is preferably made of conical or funnel-like shape and provided with a number of openings 17, 18 which are angularly disposed relative to each other for tightly enclosing and guiding the conduits (not shown) passing individually from one cell 1 through openings 17, 18 and jointly through the larger opening at the other end of socket 16 into the cell 2.

For securing the socket 16 to the end walls 3' and 4' of the cells 1 and 2, the outer ends thereof are provided with annular sealing projections each forming an annular cavity 21 therein of substantially circular cross section which it slit along its outer periphery so as to form a pair of annular suction cups 20 the wall strength of which gradually decreases toward their outer edge, and, when inserted in the lead-in openings 5' and 6', respectively, will tightly grip the wall portion adjacent the openings on both sides of each end wall 3' and 4'. The slightly outwardly curved shape of the end wall 19 of the socket 16 facilitates the insertion thereof into the lead-in opening 6' of the cell wall 4' since, when radially compressed in the space intermediate walls 3' and 4', the central portion of end wall 19 will bulge outwardly, thereby reducing the outer diameter thereof and allowing it to slip easily into the opening 6' and, when released, to snap back into the position shown in Fig. 3. The sealing projection at the narrower end of the socket 16 is still more easily inserted into the opening 5' as the large central opening in this end of the socket permits it to be very easily compressed radially inwardly.

The embodiment of the invention shown in Fig. 4 is similar to that shown in Fig. 3, except for the fact that the central portion 22 bridging the space between the walls 3' and 4' of the adjacent cells is of substantially cylindrical shape and that two similar end walls 23 and 24 are provided on each end of the socket with coaxial openings 25, 26 for individually sealing and supporting a plurality of conduits (not shown) passing therethrough. Insertion into the cell wall openings 5' and 6' is easily effected by compressing the central portion 22 radially inwardly and thereby collapsing the rubber end walls 23 and 24.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. In combination with a motor vehicle having at least two separate, adjacent compartments and a space intermediate said compartments, said compartments having openings in the walls facing each other, a resilient lead-in element bridging said space, connecting said walls, and mounted within said openings, said element being a tubular socket with bearing means forming at least one opening at one end thereof for closely surrounding and resiliently supporting at least one conduit, said tubular socket surrounding said conduit over the greatest portion thereof with play and extending from one of said compartments to the other, and radially extending resilient means on said element abutting against the walls forming said openings for sealing said wall openings against each other as well as against said intermediate space.

2. In combination with a motor vehicle having at least two separate, adjacent compartments and a space intermediate said compartments, said compartments having openings in the walls facing each other, a resilient lead-in element bridging said space, connecting said walls, and mounted within said openings, said element being a tubular socket with resilient bearing means located at least at one end thereof for tightly surrounding and resiliently supporting therein at least one conduit, said tubular socket surrounding said conduit over the greatest portion thereof with play except at said one end and extending from one of said compartments to the other, and radially extending resilient means on said element abutting against the walls forming said openings for sealing said wall openings against each other as well as against said intermediate space, said bearing means including resilient means at least near one end of said socket for mounting and sealing said conduit.

3. In combination with a motor vehicle having at least two separate, adjacent compartments and a space intermediate said compartments, said compartments having openings in the walls facing each other, a resilient lead-in socket bridging said space, connecting said walls, and mounted within said openings, said socket being a tubular socket with bearing means at least at one end thereof for tightly surrounding and resiliently supporting at least one conduit, said tubular socket surrounding said conduit over the greatest portion thereof with considerable play except at said one end and extending from one of said compartments to the other, said bearing means including resilient means at least near one end of said socket for mounting and sealing said conduit, and resilient means radially projecting from the outer wall of said socket abutting against the walls forming said openings for resiliently mounting said socket and the conduit therein in said walls, for tightly sealing the openings of both compartments against each other as well as against said intermediate space, and for locking said socket to the wall surface adjacent the opening in at least one compartment.

4. In combination with a motor vehicle having at least two separate, adjacent compartments and a space intermediate said compartments, said compartments having openings in the walls facing each other, a resilient lead-in socket bridging said space, connecting said walls, and mounted within said openings, said socket having at least one opening therein for passing at least one conduit therethrough from one of said compartments to the other, said socket loosely surrounding said conduit and being spaced from said conduit along the greatest part of the length of said socket, said socket having at least one bearing means formed by the wall portion near at least one end thereof for closely surrounding said conduit and sealing the opening in said socket and for resiliently mounting said conduit in said socket, said bearing means extending at least substantially into one of said compartments, and resilient means radially projecting from the outer wall of said socket and abutting against the walls forming said openings for resiliently mounting said socket and the conduit therein in said walls, for tightly sealing the openings of both compartments against each other as well as against said intermediate space, and for locking said socket to the wall surface adjacent the opening in at least one compartment.

5. In combination with a motor vehicle having at least two separate adjacent compartments and a space intermediate said compartments, said compartments having coaxial flanged openings in the walls facing each other, a resilient lead-in socket bridging said space, connecting said walls, and mounted within said flanged openings, said socket having an opening therein for passing a conduit therethrough from one of said compartments to the other, said socket loosely surrounding said conduit and being spaced from said conduit along the greatest part of the length of said socket, said socket having a wall portion near one end thereof constituting bearing means for closely surrounding said conduit and sealing the opening in said socket and for resiliently mounting said conduit in said socket, said wall portion extending entirely within one of said compartments and spaced from the wall thereof, resilient means radially projecting from the outer wall of said socket within said intermediate space for resiliently mounting said socket and the conduit therein in said walls and for tightly sealing the flanged openings of both compartments against each other as well as against said intermediate space, and means on said socket cooperating with at least one of said projections for locking said socket against axial movement relative to the respective compartment wall.

6. In combination with a motor vehicle having at least two separate adjacent compartments and a space intermediate said compartments, said compartments having openings in the walls facing each other, a resilient lead-in socket bridging said space, connecting said walls, and mounted within said openings, said socket having a wide opening therein for passing a plurality of conduits therethrough from one of said compartments to the other, said socket loosely surrounding said conduits and being spaced from said conduits along the greatest part of the length of said socket, said socket having a wall portion forming bearing means for said conduits near at least one end thereof, said wall portion having a series of smaller openings therein adapted to receive the individual conduits with the walls of said openings adapted to closely surround said individual conduits and sealing said small openings, and for resiliently mounting said conduits in said socket, resilient means radially projecting from the outer wall of said socket within said intermediate space for resiliently mounting said socket and the conduits therein in said walls, and for tightly sealing said compartment openings from the outside of said compartments, and other resilient means radially projecting from the outer wall of said socket and within said compartments, and cooperating with said first resilient means for sealing said compartment openings from the inside of said compartments, and for locking said socket against axial movement relative to the respective compartment wall.

7. The combination as defined in claim 6, wherein said socket is of substantially funnellike shape, open at the narrower end of the wide opening within said socket, said wall portion with said small openings for the individual conduits being located at the wider end of said socket.

8. The combination as defined in claim 6, wherein the socket is of cylindrical, drumlike shape having a wall portion with said small openings for the individual conduits at both ends, the respective small openings in both of said walls being coaxial, as well as parallel with each other.

9. The combination as defined in claim 6, wherein the radial projections at both sides of each compartment wall are of annular shape so as to surround said compartment openings and uniformly and resiliently adhere to the wall portions adjacent said openings on both sides thereof, the cross sectional thickness of said projections gradually decreasing toward their outer ends.

10. The combination as defined in claim 6, wherein the radial projections at both sides of each compartment wall are of annular shape so as to uniformly surround said compartment openings, said projections being curved toward such compartment wall, the cross sectional thickness of said projections gradually decreasing toward their outer ends.

References Cited in the file of this patent

UNITED STATES PATENTS

| | | |
|---|---|---|
| 1,678,054 | Buckley | July 24, 1928 |
| 2,383,018 | Shere | Aug. 21, 1945 |
| 2,550,021 | Rappl | Apr. 24, 1951 |
| 2,678,231 | Barenyi | May 11, 1954 |
| 2,693,982 | Barenyi | Nov. 9, 1954 |